US006922489B2

United States Patent
Lennon et al.

(10) Patent No.: US 6,922,489 B2
(45) Date of Patent: *Jul. 26, 2005

(54) IMAGE INTERPRETATION METHOD AND APPARATUS

(75) Inventors: Alison Joan Lennon, Balmain (AU); Delphine Anh Dao Le, Glebe (AU)

(73) Assignees: Canon Kabushiki Kaisha, Tokyo (JP); Canon Information Systems Research Australia Pty. Ltd., North Ryde (AU)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/182,006

(22) Filed: Oct. 29, 1998

(65) Prior Publication Data

US 2002/0034330 A1 Mar. 21, 2002

(30) Foreign Application Priority Data

Oct. 29, 1997 (AU) .............................................. PP0096

(51) Int. Cl.⁷ ........................... G06K 9/62; G06K 9/72; G06K 9/46; G10L 15/14
(52) U.S. Cl. ...................... 382/228; 382/229; 382/190; 704/256
(58) Field of Search ............................... 382/228, 229, 382/181, 190, 224, 225, 232; 704/256; 707/104, 500

(56) References Cited

U.S. PATENT DOCUMENTS

| 5,493,677 A | * | 2/1996 | Balogh et al. ............... 707/104 |
| 5,617,488 A | | 4/1997 | Hong et al. .................. 382/229 |
| 5,828,809 A | | 10/1998 | Chang et al. .................. 386/69 |
| 5,991,781 A | * | 11/1999 | Nielsen ...................... 707/513 |
| 6,360,234 B2 | * | 3/2002 | Jain et al. ................. 715/500.1 |

FOREIGN PATENT DOCUMENTS

EP        0 692 768         1/1996

OTHER PUBLICATIONS

Kumar et al, "Joint Segmentation and Image Interpretation"; IEEE Proceedings on Image Processing, ISBN: 0-7803-3259-8, vol. 1, pp. 853-856, Sep. 1996.*

(Continued)

Primary Examiner—Mehrdad Dastouri
(74) Attorney, Agent, or Firm—Fitzpatrick Cella Harper & Scinto

(57) ABSTRACT

A method of interpreting an image using a statistical or probabilistic interpretation model is disclosed. The image has associated therewith contextual information. The method comprises the following steps: providing the contextual information associated with the image for analysis; analyzing the additional contextual information to identify predetermined features relating to the image; and biasing the statistical or probabilistic interpretation model in accordance with the identified features.

32 Claims, 6 Drawing Sheets

OTHER PUBLICATIONS

Modestino et al, "A Markov Random Field Model–Based Approach to Image Interpretation"; IEEETransaction on Pattern Analysis and Machine Intelligence, ISSN: 0162–8828, vol. 14, Issue 6, pp. 606–615, Jun. 1992.*

Kim et al, "An Integration Scheme for Image Segmentation and Labeling Based on Markov Field Model"; IEEE Transaction on Pattern Analysis and Machine Intelligence, ISSN: 0162–8828, vol. 18, Issue 1, pp. 69–73, Jan. 1996.*

Kim et al, "Efficient Image Understanding Based on the Markov Random Model and Error Backpropagation Network", 1992, IEEE Paper ISBN: 0–8186–2910, pp. 441–444.*

"Automatic Target Recognition Using a Passive Multisensor Suite", R.F. Sims, et al., Optical Engineering, US, Soc. of Photo–Optical Instrumentation Engineers, Bellingham, vol. 31, No. 12, Dec. 1, 1992, pp 2584–2593, XP000329820, ISSN: 0091–3286.

"A Markov Random Field Model–Based Approach to Image Interpretation," J.W. Modestino, et al., Markov Random Fields Theory and Application, pp 369–408, Academic Press, Inc., 1993.

* cited by examiner

| Node or Region | Associated Cliques |
|---|---|
| R1 | {R1}, {R1, R2}, {R1, R3} |
| R2 | {R2}, {R2, R4}, {R2, R8}, {R2, R4, R8} |
| R3 | {R3}, {R3, R4}, {R3, R7}, {R3, R4, R7} |
| R4 | {R4}, {R4, R5}, {R4, R6}, {R4, R7}, {R4, R8} |
| R5 | {R5} |
| R6 | {R6} |
| R7 | {R7} |
| R8 | {R8}, {R8, R9} |
| R9 | {R9} |

Fig. 6

IMAGE INTERPRETATION METHOD AND APPARATUS

The present invention relates to a method and apparatus for statistical analysis of images, and in particular analysis of colour images for the purpose of interpretation in terms of semantic labels. The semantic labels can subsequently be used as a basis for tasks such as content-based retrieval and content-based rendering advice.

BACKGROUND TO THE INVENTION

Image interpretation is the process of understanding the content of an image through identification of significant objects or regions of the image and analysis of the object's spatial arrangement. Traditionally the task of image interpretation required human analysis. This is expensive and time consuming, consequently considerable research has been directed towards constructing automated image interpretation systems.

Most existing image interpretation systems involve low-level and high-level processing. Typically, low-level processing involves the transformation of an image from an array of pixel intensities to a set of spatially related image primitives, such as edges and regions. Various features can then be extracted from the primitives (eg., average pixel intensities). In high-level processing, image domain knowledge and feature measurements are used to assign object or region labels, or interpretations, to the primitives and hence construct a description as to "what is present in the image".

Early attempts at image interpretation were based on classifying isolated primitives into a finite number of object classes according to their feature measurements. The success of this approach has been limited by erroneous or incomplete results that often arose from low-level processing and feature measurement errors due to the presence of noise in the image. Most recent techniques incorporate spatial constraints in the high-level processing. This allows ambiguous regions or objects of an image to be identified as the result of successful recognition of neighbouring regions or objects.

More recently, the spatial dependence of region labels for an image has been modelled using statistical methods, such as Markov Random Fields (MRF). An advantage of the MRF model is that it provides a general and natural model for the interaction between spatially related random variables, and there are relatively flexible optimization algorithms that can be used to find the (globally) optimal realisation of the field. Typically, the MRF is defined on a set of preliminary segmented regions which have been obtained by one of many available region-based image segmentation methods. The MRF model provides a powerful mechanism for incorporating knowledge about the spatial dependence of semantic labels with the dependence of the labels on measurements (low-level features) from an image.

However, although statistical models, such as MRFs, potentially provide a general, domain-independent approach to image interpretation, initial results are still limited to relatively narrow application domains because of the ill-posed nature of the problem of image interpretation. That is, the nature of the problem of image interpretation is that while a solution to a particular interpretation of an image may exist, the solution may not be unique and/or the solution does not necessarily continuously vary with perturbations of the image data. For example, the non-unique nature of the solution to a particular image interpretation provides an undesirable level of ambiguity.

Therefore, a need clearly exists for a statistical image interpretation process (or processes) that reduces the level of ambiguity and thus improves both the performance of and level of accuracy in identifying and labelling image regions or image objects.

SUMMARY

In accordance with a first aspect of the invention, there is provided a method of interpreting an image, the interpretation being based on a statistical or probabilistic interpretation model, the image having associated therewith contextual information, said method comprising the steps of:

providing the contextual information associated with the image for analysis;

analysing the additional contextual information to identify predetermined features relating to the image; and biasing the statistical or probabilistic interpretation model in accordance with the identified features.

In accordance with a second aspect of the present invention, there is provided a method of interpreting an image, to identify at least one object in the image, the image having associated therewith contextual information, the interpretation being based on a statistical or probabilistic interpretation model, said method comprising the steps of:

providing contextual information associated with the image for analysis;

analysing the contextual information to identify predetermined features relating to the image associated with the additional contextual information;

biasing the statistical or probabilistic interpretation model in accordance with the identified features;

analysing the image in accordance with the biasing statistical or probabilistic interpretation model; and providing metadata identifying or describing the at least one object in the image.

In accordance with a third aspect of the present invention, there is provided an image interpretation system for identifying at least one object of an image, the image comprising a plurality of objects, the system comprising:

input means for inputting image data and associated contextual information;

analysing means for analysing the contextual information to identify predetermined features of the information;

parameter adjusting means for biasing a statistical or probabilistic interpretation model in accordance with the identified predetermined features; and image data analysing means based on the biased statistical or probabilistic interpretation model for identifying at least one object in the image.

In accordance with a fourth aspect of the present invention, there is provided a computer readable medium including instruction modules arranged to identify at least one object in an image, said module comprising:

an analysing module provided for identifying from the contextual information predetermined features relating to the image;

a biasing module for altering a statistical or probabilistic interpretation model in accordance with the identified features;

an image analysing module for identifying in accordance with the biasing statistical or probabilistic interpretation model objects of the image.

BRIEF DESCRIPTION OF THE DRAWINGS

Embodiments of the present invention are described hereinafter with reference to the drawings, in which:

FIG. 6 represents a set of associated cliques for the region adjacency graph of FIG. 5.

DETAILED DESCRIPTION

Figure 1:
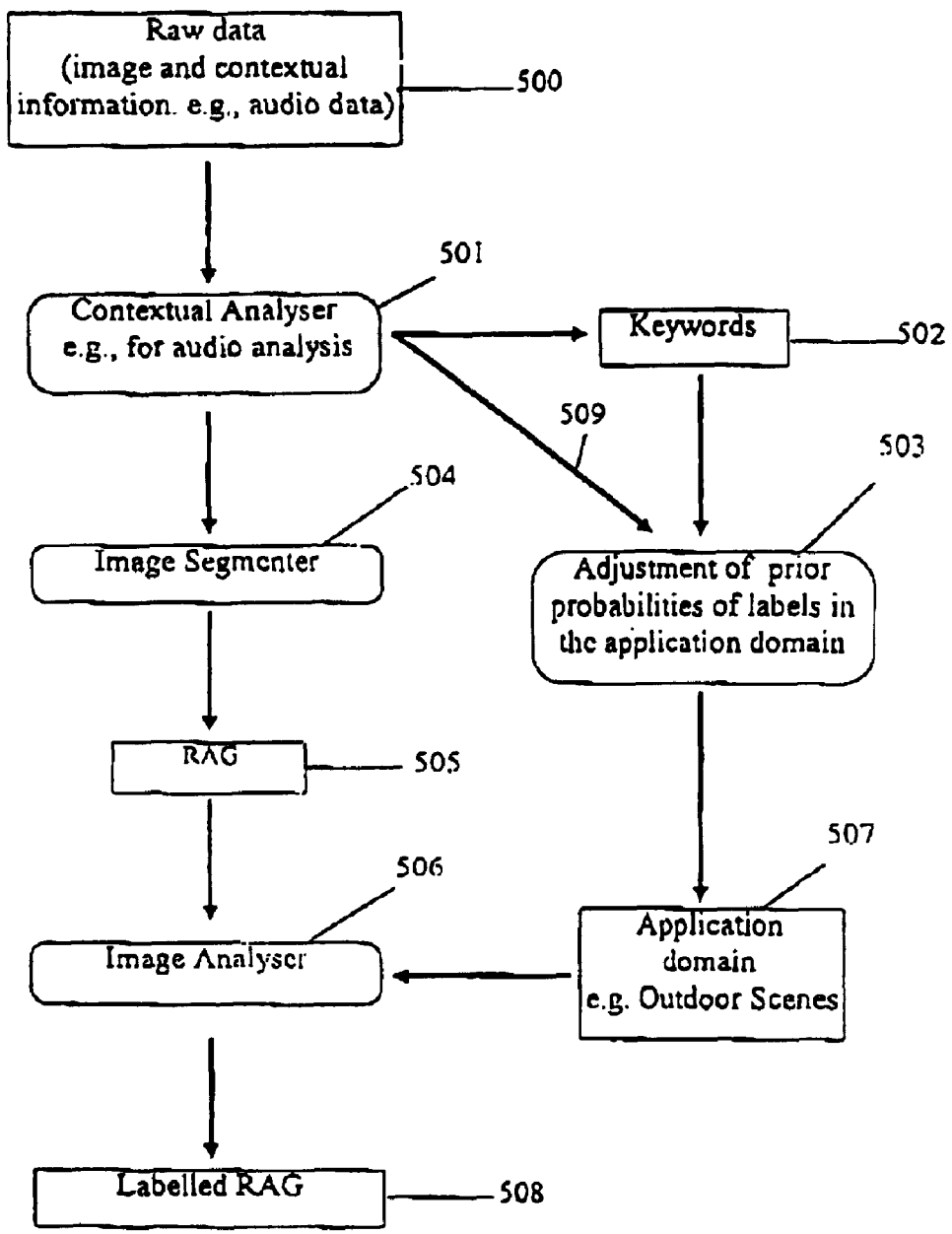
FIG. 1 is a flow diagram illustrating a process of interpreting image data according to a first embodiment of the invention.

In the embodiments of the invention, additional contextual information (ie., information in addition to (colour) image information) is used to improve the performance of statistical-model-based image interpretation systems. The additional contextual information may include information extracted from an audio channel recorded with the colour image (eg., in a digital camera), environment information (eg., GPS coordinates from a camera), and/or spectral information (eg., infrared analysis of the image). This additional contextual information can be used in the image interpretation system in two ways: (1) to select an appropriate application domain for the analysis where multiple application domains are available to an image interpretation system; and/or (2) to adjust the prior probabilities of labels in the selected or a predetermined application domain. For example, additional contextual information such as an audio cue that is interpreted to be "Smile, Granny" can be used to imply that an application domain involving people was required, or that the probability of a "person" label in the current application domain is high. Labels include semantic (labels) expressions or words that describe objects or regions of an image (eg, sky, beach, person, foliage, water, land, etc.).

So as not to unduly obscure the present invention, the embodiments are described with reference to a statistical Image Interpretation System designed for images captured using a digital camera that permits an optional recording of additional contextual information which is associated with each captured image. The additional contextual information, for the purpose of describing this embodiment, is considered to be audio information. However, other forms of contextual information may be used without departing from the scope and spirit of the invention. The audio information remains associated with each captured image upon transfer of data (audio and image) from the camera to the Image Interpretation System. For example, the Image Interpretation System may be implemented using a general purpose computer, adapted to receive such data, having and executing software for interpreting an image portion of the received data into a plurality of regions, of which preferably at least one region is identified and labelled.

In a variation of this embodiment, the Image Interpretation System may be located in a digital camera. An image downloaded from the digital camera is associated with metadata comprising labels describing various regions (or objects), and information about their arrangement.

Process of First Embodiment

The first embodiment can be described with single or multiple application domains. In general, an application domain comprises a knowledge base and functionality required to label a predetermined type of image. For example, a single, quite general, application domain, such as "Rural Outdoor Scene", can include the knowledge and functionality to label image regions such as sky, foliage, water bodies (lakes, ocean, river), road, building and people. An Image Interpretation System comprising a single application domain is shown in FIG. 1.

More sophisticated Image Interpretation Systems may be able to invoke at least one of several application domains. For example, an Image Interpretation System can select at least one application domain from a set consisting of Rural Outdoor Scenes, Urban Outdoor Scenes, Sporting Scenes and People Scenes. In an Image Interpretation System where multiple application domains are available, one domain is registered as a default domain. Contextual information, preferably gathered from a plurality of input sources and analysed in accordance with the preferred embodiment may be used to select an appropriate application domain for a particular image interpretation problem. The single domain can be selected, for instance, from an Application Domain Database 511 in FIG. 2.

FIG. 1 provides an overview of the typical steps of the first embodiment, in which raw data 500 comprising image pixel data (eg., pixel intensities for a multiplicity of colour channels, eg., red, green and blue) and associated audio information is transferred from a camera to the Image Interpretation System. The additional contextual information in this case is an audio stream, which is analysed 501 by a contextual analyser. Under circumstances where the additional contextual information is derived from a plurality of sources, the contextual analyser may include more than one contextual analysing unit. For example, if the camera optionally records audio information, Global Positioning System (GPS) coordinates and infrared activity of a scene captured by the camera, the contextual analyser may include an audio analysing unit, a GPS analysing unit and an infrared analysing unit. The contextual analyser is used to alter the prior probabilities of region labels in the application domain to bias the labelling of an image towards objects or regions of an image likely to be present.

In step 501, a contextual analyser (in this example, including an audio analysing unit) is used to recognise key words or phrases in the audio stream (information) and check whether these key words/phrases suggest that a particular label is more likely to occur in the image than another label. Following step 501, image processing continues at step 504, while the contextual information is used at steps 502 or 503. A list 502 of predetermined key words and phrases is provided for preferably each label of an application domain. In the first embodiment, with a single application domain, the prior probabilities for labels may be adjusted on the basis of the list of key words/phrases 502 being stored for each label in the application domain with a prior probability weighting factor for each key word/phrase in the list 502. Typically, the higher the probability weighting factor the more likely that a region of an image, described by a predetermined label, is present or exists in the image. In an Image Interpretation System having multiple application domains, each application domain could contain a list of key words/phrases that is associated with the domain. Further, each label of an application domain can contain or be associated with a substantially similar list of key words/phrases that can be substantially similar or different to the key words/phrases associated with the application domain. If so, the audio information (ie. contextual) is used to select the application domain to be used in the analysis and, if required, bias each label in accordance with the resultant analysis of the audio information as previously described with reference to the single application domain.

The contextual information associated with an image need not be of the form of audio information or infrared (spectral) information. For example, textual annotations, phrases or keywords that are associated with an image can be used. Images with such associated textual annotations, phrases or keywords may result, for instance, from a database of images have associated information for each image. This form of annotated text can be used in a Image Interpretation System and analysed as a source of contextual information.

The contextual analyser, upon consulting the key word and phrase list 502, adjusts weight probabilities of labels of a predetermined application domain in step 503 in accordance with a likelihood that one or more labels represent a region or object of an image. For example; if an image gathered by a digital still (or video) camera is of the sun going down on the horizon, key words extracted from audio information recorded and associated with the image may include the word "sunset". If so, the likelihood that the image is an outdoor scene and includes a "sun" is very probable. Therefore, in accordance with the first embodiment, in an application domain of "Outdoor Scenes", a label representing the "sun" is given a greater weight probability than it would have if the key word sunset was not identified from the audio information. The weight probability of each label of an application domain is typically set to a default value at an initial step in the Image Interpretation System and altered according to the results of the contextual analyser.

The weight probability of each label of an application domain is preferably stored with each corresponding label of the domain in step 507. Further, where the contextual analyser can directly influence the weight probability of a label without recourse to the key word/phrase list 502, that is, the contextual analyser performs analysis, other than audio, analysis not requiring a key word/phrase list 502 search, the contextual analyser can directly alter the probability of the weights as indicated by flow arrow 523 of FIG. 3 accordingly. An example, of an instance where the contextual analyser need not require the key word/phrase list 502 is where contextual information is derived from an infrared detector unit 522.

Following step 501, the image is segmented into homogeneous regions by an image segmenter, 504, using a region-based segmentation method. Known region segmentation methods include segmentation algorithms which use Markov Random Field models for colour and/or textures. The segmentation algorithms typically comprise dividing the image into clusters of pixels and applying a merging process to similar adjacent pixel clusters, to a predetermined optimum level, to divide or segment an image at edges or boundaries of graphical objects of the image. Image segmentation methods other than those utilising an MRF model on the pixel array as described hereinafter can be substituted without departing from the scope and spirit of the invention. However, it is preferred that an image segmentation process that segments the image based on texture and colour be used.

A result of the segmentation process in step 504 is a Region Adjacency Graph (RAG) 505 which is defined to be a graph G which contains a set R of disjoint regions and a set E of edges connecting the regions, ie., G={R, E}. An example of a segmented image and a corresponding RAG is described hereinafter with reference to FIGS. 4 and 5.

In step 506, the Image Analyser, preferably, analyses and optimally labels each region represented by the RAG using the predetermined labels and corresponding weight probabilities of the application domain previously stored in step 507. The Image Analyser outputs a labelled RAG, or metadata 508, representing a description of the content of the image that can be used for higher-level processes such as content-based retrieval. Preferably the Image Analyser uses an MRF (statistical) model to perform the analyses and labelling.

However, other statistical models may be used that directly or indirectly rely on probabilistic methods of labelling regions of an image based on properties of a region and properties of: predetermined neighbouring regions used. For example, a neural network approach may be used. Typical properties of a region in an image can include feature measurements of the region or predetermined knowledge.

Process of Second Embodiment

Figure 2:
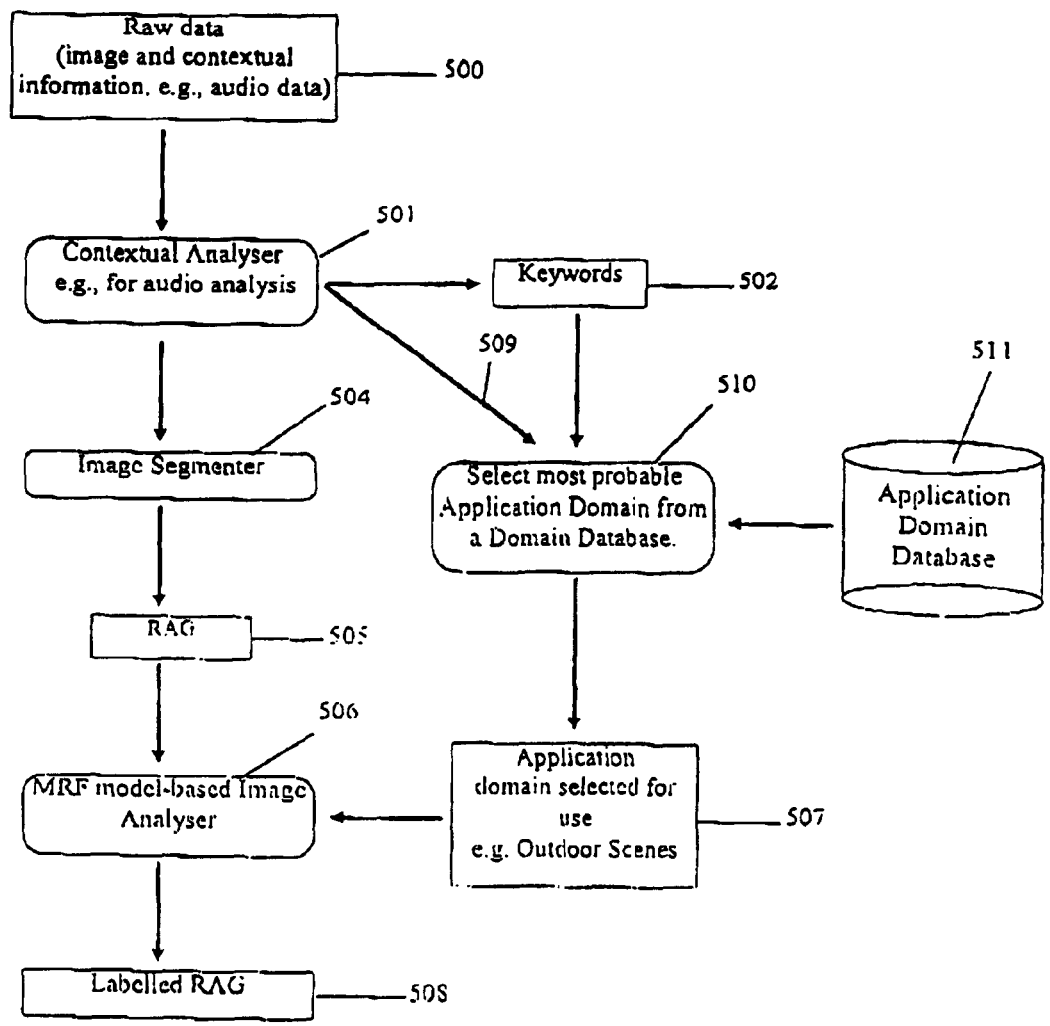
FIG. 2 is a flow diagram illustrating a process of interpreting image data according to a second embodiment.

FIG. 2 is a flow diagram of a second embodiment where multiple application domains are used. The description of FIG. 2 is substantially similar to that of FIG. 1, except that step 503 is replaced with step 510 in which the contextual analyser now selects an application domain from a database 511 of application domains. A set of labels and their corresponding weight probabilities associated with the selected domain is then stored in step 507 on a memory storage device for use by the image analyser 506. Preferably, in addition to selecting the application domain, the contextual analyser further alters the corresponding weight probabilities associated with the selected domain as described with reference to FIG. 1.

Contextual Analyser

Figure 3:
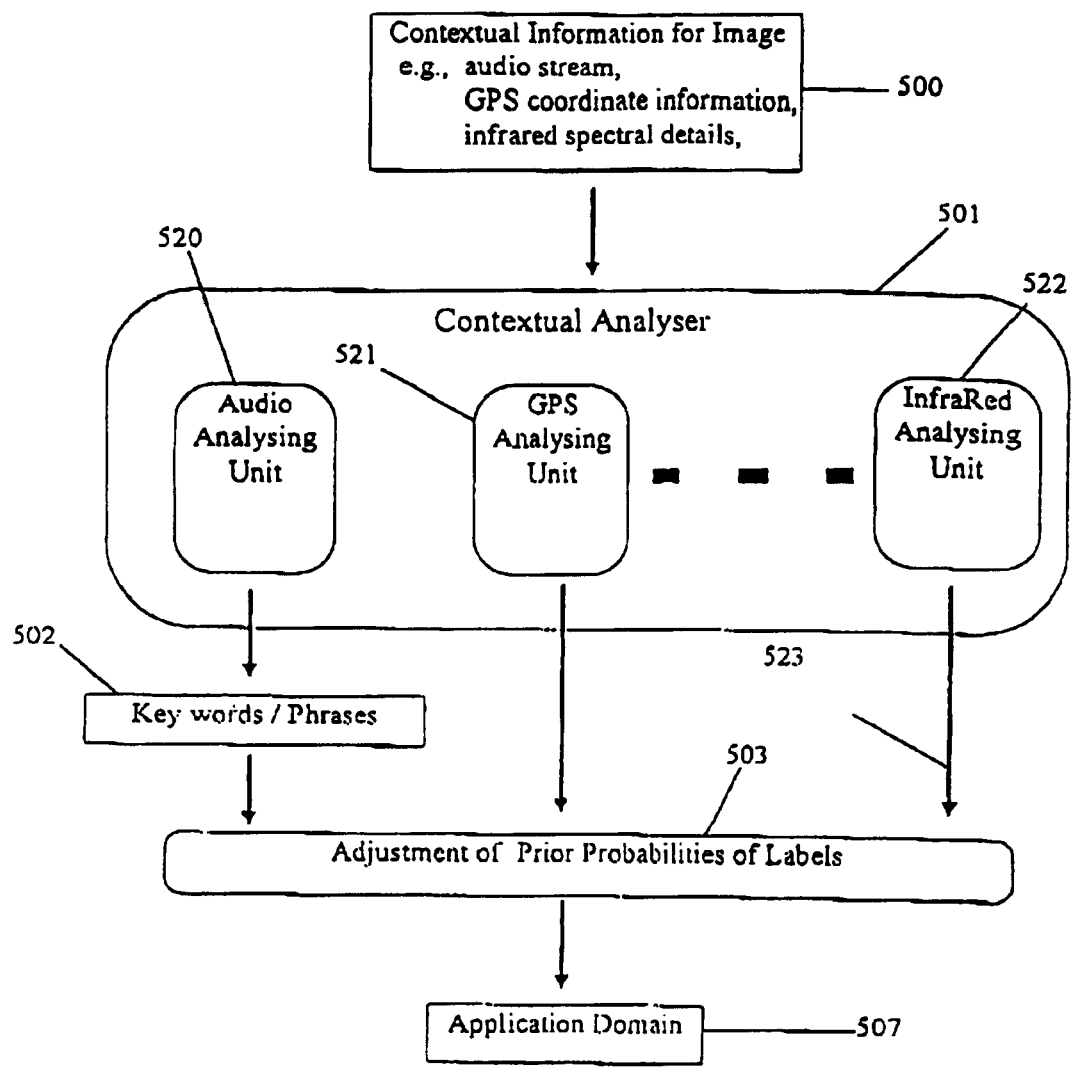
FIG. 3 is a block diagram illustrating a contextual analyser in accordance with the embodiments of the present invention.

FIG. 3 shows in more detail the contextual analyser 501 of FIG. 1 and FIG. 2. Contextual information 500, associated with predetermined image data, comprising an audio stream, GPS coordinate information, infrared spectral details is input to the contextual analyser 501. The contextual analyser 501 preferably comprises a plurality of analysing units 520 to 522, each unit capable of analysing at least one type of information that forms part of the contextual information. For example, at least three analysing units are shown in FIG. 3. The three units 520, 521 and 522 are provided for each type of contextual information to be analysed: an audio analysing unit 520 for the audio information; a GPS analysing unit 521 for analysing the GPS information; and an infrared analysing unit 522 provided for analysing infrared spectral information captured and associated with the image.

The audio analysing unit 520 utilises a key word/phrase list 502 to determine whether weight probabilities of predetermined labels in a specified application domain are to be modified (biased), by an adjusting unit 503, in accordance with a likelihood of finding an object or region of an image corresponding to a predetermined label. The weight probabilities are stored, preferably in memory 507, and associated with the corresponding labels.

Figure 4:
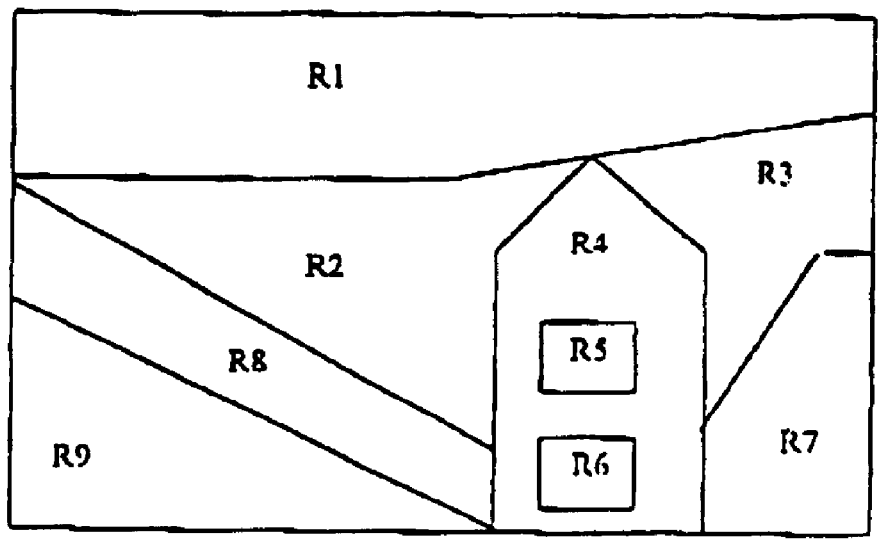
FIG. 4 is a representation an image divided into a plurality of image regions in accordance with the first embodiment.
Figure 5:
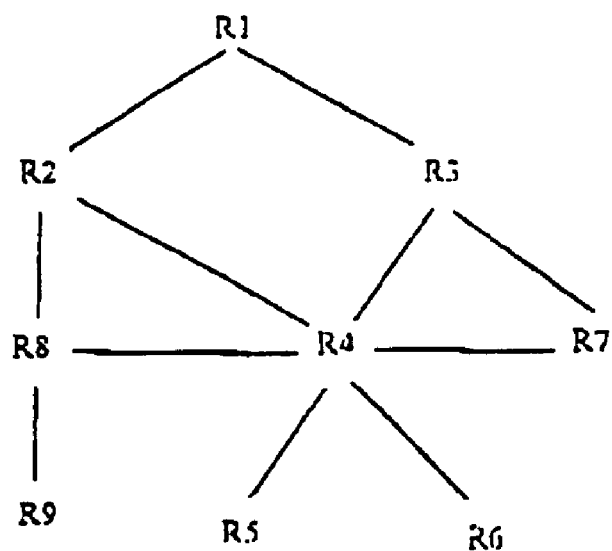
FIG. 5 is an example of a region adjacency graph associated with the image region divisions of FIG. 4.

The process of image interpretation is described hereinafter with reference to FIGS. 4 to 6 as one of optimal labelling of the regions in the graph G. If the application domain consists of a set of p labels, $L=\{L_1, L_2, L_3, \ldots, L_p\}$ with prior probabilities, $Pr_L=\{Pr_{L1}, Pr_{L2}, Pr_{L3}, \ldots, Pr_{Lp}\}$, that have been refined by the contextual information, the interpretation process can be viewed as one of estimating the most probable set of labels on the G.

Suppose that the G consists of N disjoint regions, then let $X=\{X_1, X_2, X_3, \ldots, X_N\}$ be a family of random variables on the RAG. Then X is a random field, where $X_i$ is the random variable associated with $R_i$ and the realisation of $X_i$, and $x_i$, is a member of the set of labels, L. Suppose also that there exists a neighbourhood system on G denoted by:

$$\Gamma = \{n(R_i);\ 1 < i < N\}, \tag{1}$$

where $n(R_i)$ is a set of regions in R that are neighbours of $R_i$. In the first embodiment of the present invention, a neighbourhood system for a region, $R_i$, is that region and all other regions that have some common boundary with $R_i$. The regions $R_i$ are shown in FIG. 4, that is $R_1$ representing a "sky" region, $R_2$ representing a portion of a "field" region, etc.

Let $\Omega$ denote the set of all possible labelling configurations and let $\omega$ denote a configuration in $\Omega$:

$$\Omega = \{\omega = \{x_1, x_2, x_3, \ldots, x_N\};\ x_i \in L,\ 1 \le i \le N\}$$

Then X is MRF with respect to $\Gamma$ if, $P((X=\omega)>0)$ for all realisations of X;

$$P(X_i = x_i | X_j = x_j, R_j \ne R_i) = P(X_i = x_i | X_j = x_j, R_j \in n(R_i)), \tag{2}$$

A desirable feature of the MRF is that its joint probability density function, $P(X=\omega)$, has a Gibbs distribution ie., $$P((X=\omega)) = Z^{-1} \exp[-U((\omega)/T)], \tag{3}$$

where T is the temperature, $U(\omega)$ is the Gibbs' energy function and Z is the partition function:

$$Z = \sum_\omega \exp[-U((\omega)/T)]. \tag{4}$$

The Gibbs energy function can be expressed using the concept of cliques, where a clique c associated with G is a subset of R such that it contains either a single node or several nodes that are all neighbours of each other. Cliques associated with each node of the RAG of FIG. 5, and accordingly each region of FIG. 4, are shown in FIG. 6. For example; cliques shown in FIG. 6 associated with node R4, that is, associated cliques {R4}, {R4,R5}, {R4,R6}, {R4, R7}, {R4,R8} are representative of the regions of the image of FIG. 4 adjacent to region R4. Note, that clique {R3,R4}, for example, has been considered in the list associated with R3, Let C denote the set of cliques for G. A clique function, $V_c$, is a function with the property that $V_c(\omega)$ depends on the $x_i$ values (labels) for which (i∈c). Lower case letter "c" denote a clique belonging to the set of cliques. A family of clique functions is referred to as a potential $U(\omega)$. The potential can be obtained by summing over clique functions for c belonging to set C for G:

$$U(\omega) = \sum_{c \in C} V_c(\omega). \tag{5}$$

Region-based feature measurements obtained from the image and prior knowledge are incorporated into the clique functions. The likelihood of a particular region label given a set of region feature measurements can be estimated using various methods which may involve the use of a training set (which may, for example, be used to train a neural network) or may be based on empirical knowledge. Similarly, prior knowledge can be incorporated into the clique functions in the form of constraints that may or may not be measurement-based For example, the constraints may be of the form that label $L_i$ and $L_j$ cannot be adjacent (ie., have zero probability of being neighbours), or if $L_i$ and $L_j$ are adjacent, the boundary is likely to have certain characteristics (eg., fractal dimension). Minimising the Gibbs energy of Equations 3 to 5 results in a maximisation of the joint probability density function, $P(X=\omega)$.

In the first embodiment, finding an optimum region label configuration for a RAG given predetermined measurements obtained from an image M and knowledge K (the knowledge being incorporated into corresponding clique functions) and a plurality of prior probabilities for predetermined labels in an application domain, Pr (which have been refined by analysis of contextual information) can be viewed as optimising a predetermined label at a site, i, since the labelling of a region depends substantially on a neighbourhood region (a property of MRF). The knowledge K is given by predetermined known conditions of desirable outcomes associated with a particular application domain and can easily be incorporated into clique functions as a predetermined weight probability. For example, if a "Rural Outdoor scene" application domain is to be used to label regions (objects) of an image, it is likely that a region "sun" is near a region "sky" and unlikely that an object "car" is located above a region "water" and therefore knowledge of these predetermined conditions can be factored into the clique functions involving the regions. In this manner, the dependence of a label at region i on M and K is incorporated into the design clique functions, therefore the conditional probability density function for $X_i$ being $x_i$ at site i can be written as:

$$P(X_I = x_i | X, M, K, Pr) = Z_i^{-1} \exp\left[-\frac{1}{T}\sum_{c_i} V_{c_i}(\omega)\right] Pr_{x_i}, \text{ and} \tag{6}$$

$$Z_i = \sum_{x \in L} \exp\left[-\frac{1}{T}\sum_{c_i} V_{c_i}(\omega_x)\right],$$

where $\omega_x$ denotes the configuration which is x at site i and agrees with $\omega$ elsewhere. Further the summation over $c_i$ in Equation (6) indicates a summation over all cliques including site i.

Using Equation (6) for selecting a most probable label at a site is substantially equivalent to minimising a weighted (by prior probability of the label) Gibbs energy function at the site. The optimum region label configuration for the image can be obtained by iteratively visiting each of the N sites on G and updating a label at each site. There are several known methods by which region labels can be updated. For example, a new label is selected for a region from either a uniform distribution of the labels or from the conditional probability distribution of the labels on the MRF (ie., by a Gibbs Sampler). An iterative procedure of visiting and updating sites can be implemented within a simulated annealing scheme (where the temperature is gradually decreased), or if more rapid convergence is desirable, then the iterated conditional modes (ICM) method can be used. In the latter method (ie. ICM), sites on the RAG are iteratively visited and at each site, the label of the region is updated to be the label that is most probable. A method of update other than the methods indicated above can be used to update the region labels without departing from the scope and spirit of the present invention.

Figure 7:
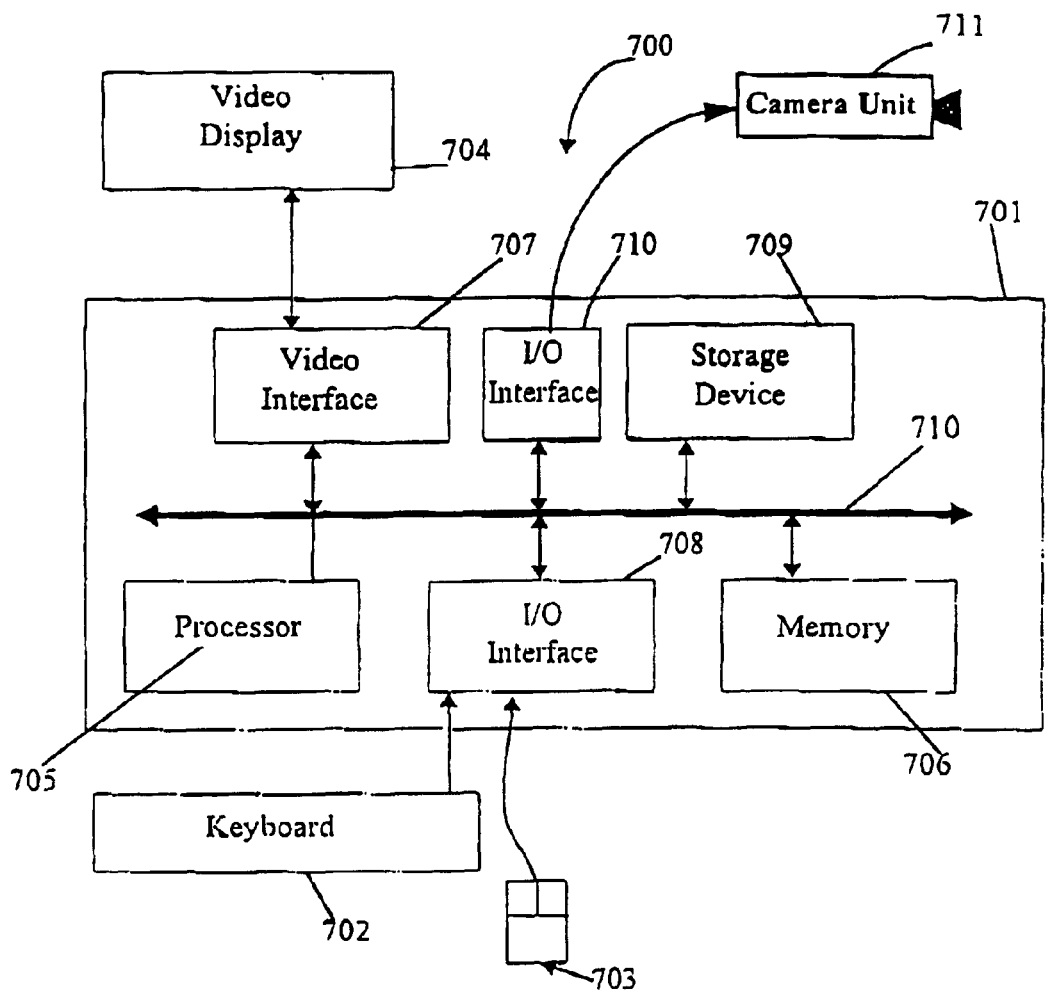
FIG. 7 is a block diagram of a general purpose computer with which the embodiments of the invention may be practised.

The embodiments of the invention can also be practised using a conventional general-purpose computer, such as that shown in FIG. 7, wherein the process described with reference to FIGS. 1 to 6 is implemented as software executed on the computer. The computer system 700 includes the computer 701, input devices 702, 703 and a display device 704.

The computer 701 comprises at least one processor unit 705, a memory unit 706 which typically include random access memory (RAM) and read only memory (ROM), input/output (I/O) interfaces including a video interface 707, keyboard and mouse interface 708 and an I/O interface 710 for downloading from a camera unit 711. The storage device 709 can include one or more of the following devices: a floppy disk, a hard disk drive, a CD-ROM drive, magnetic tape drive or similar a non-volatile storage device known to those skilled in the art. The components 705 to 709 of the computer 701 typically communicate via an interconnected bus and in a manner which results in a usual mode of operation of the computer system 700 known to those in the relevant art. Examples of computer systems on which the embodiments can be practised include IBM-PC/ATs and compatibles, Sun Sparcstations or alike computer system.

The camera unit 711 is capable of recording a still image into storage (eg. memory) and additional information, for instance, a sound cue or infrared data that is associated with the still image also recorded. Both the image data and the associated additional (contextual) information are downloaded to the computer where the interpretation and labelling is performed in accordance with the embodiment hereinbefore described.

The foregoing describes a small number of embodiments of the present invention, and modifications, obvious to those skilled in the art can be made thereto without departing from the spirit and scope of the present invention. For example, the image segmentation process and region labelling process can be combined together, and preferably a single minimisation process applied.

What is claimed is:

1. A method of selecting a semantic label to describe a portion of an image, using a statistical or probabilistic interpretation model, said method comprising the steps of:
   providing one or more distinct semantic labels;
   determining an initial probability value for substantially each of the one or more semantic labels, each of said initial probability values being set to a predetermined default value for each of the one or more semantic labels;
   capturing contextual information simultaneously with image data representing the image, the contextual information being directly associated with the captured image data and originating from one or more different types of information sources, the information sources being distinct from the image and the captured image data representing the image;
   analyzing the contextual information captured with the image data to identify predetermined features relating to the image;
   adjusting the initial probability values for the one or more semantic labels based on the analysis of the captured contextual information and on the identified features; and
   analysing at least the portion of the image using the interpretation model in order to select at least one of the distinct semantic labels to describe the portion of the image, wherein the at least one semantic label is selected by multiplying the adjusted initial probability value for each semantic label with a conditional probability density value determined for the portion of the image.

2. The method as recited in claim 1, further including the step of:
   interpreting the image in accordance with said at least one semantic label.

3. The method as recited in claim 1, further comprising the step of providing metadata including the selected at least one label describing at least a portion of the content of the image.

4. The method as recited in claim 3, wherein the metadata is an encoded representation providing information about at least a portion of the content of the image.

5. The method as recited in claim 3, wherein the metadata includes information regarding adjacency of regions of the image.

6. The method as recited in any one of claims 3 to 5, wherein said metadata is associated with image data.

7. The method as recited in claim 6, wherein the statistical or probabilistic interpretation model is a Markov Random Field Model.

8. The method as recited in claim 1, further comprising the steps of
   segmenting the image into substantially homogeneous regions;
   analyzing the regions to provide a Region Adjacency Graph (RAG); and
   associating at least one of the one or more distinct semantic labels with the Region Adjacency Graph to provide a labeled Region Adjacency Graph.

9. The method as recited in claim 1 or 5, wherein the contextual information originated from any one or more of the following types of information sources:
   audio information;
   electromagnetic spectral information;
   environmental information;
   time lapse or sequential image information; and
   textual annotation, phrases or keywords associated with the image.

10. The method as recited in claim 9, wherein the statistical or probabilistic interpretation model is a Markov Random Field Model.

11. The method as recited in claim 1, wherein the adjusting step includes selecting a predetermined application domain from a plurality of application domains based on the features identified, wherein said predetermined application domain has an associated set of semantic labels and associated default probabilities.

12. A method of selecting a semantic label to describe an object in an image, using a statistical or probabilistic interpretation model, said method comprising the steps of:
   providing one or more distinct semantic labels;
   determining an initial probability value for substantially each of the one or more semantic labels, each of said initial probability values being set to a predetermined default value for each of the one or more semantic labels;
   capturing contextual information simultaneously with image data representing the image, the contextual information being directly associated with the captured image data and originating from one or more different types of information sources, the information sources being distinct from the image and the captured image data representing the image;
   analyzing the contextual information captured with the image data to identify predetermined features relating to the image;
   adjusting the initial probability values for the one or more semantic labels based on the analysis of the captured contextual information and on the identified features;
   analyzing at least a portion of the image comprising the object using the statistical or probabilistic interpretation model; and selecting at least one of the distinct semantic labels to describe the object in the image based on the analysis of the image, wherein the at least one semantic label is selected by multiplying the adjusted initial probability value for each semantic label with a conditional probability density value determined for the portion of the image.

13. The method as recited in any one of claims 1, 2, 3–8, 11, or 12, wherein the statistical or probabilistic interpretation model is a Markov Random Field Model.

14. An image interpretation system for selecting a semantic label to describe an object of an image, the image comprising a plurality of objects, the system comprising:

initial probability determining means for determining an initial probability values for substantially each of one or more predetermined semantic labels, each of said initial probability values being set to a predetermined default value for each of the one or more semantic labels;

capturing means for capturing image data representing the image simultaneously with contextual information the contextual information being directly associated with the captured image data and originating from one or more different types of information sources, the information sources being distinct from the image and the captured image data representing the image;

analyzing means for analyzing the captured contextual information captured with the image data to identify predetermined features of the information;

initial probability adjusting means for adjusting the initial probability values for the one or more semantic labels based on the analysis of the captured contextual information and on the identified features; and image data analyzing means for analysing at least a portion of the image comprising the object using a statistical or probabilistic interpretation model in order to select at least one of the distinct semantic labels to describe the object in the image, wherein said at least one semantic label is selected by multiplying the adjusted initial probability value for each semantic label with a conditional probability density value determined for the portion of the image.

15. The image interpretation system recited in claim 14, further comprising labelling means for providing semantic labels for each object identified.

16. A computer readable medium including instruction modules arranged to select a semantic label to describe an object in an image, using a statistical or probabilistic interpretation model, said modules comprising:

an initial probability determining module for determining an initial probability value for substantially each of one or more predetermined semantic labels, each of said initial probability values being set to a predetermined default value for each of the one or more semantic labels;

a capturing module for capturing image data representing the image simultaneously with contextual information, the contextual information being directly associated with the captured image data and originating from one or more different types of information sources, the information sources being distinct from the image and the captured image data representing the image;

an analyzing module for identifying, from the contextual information corresponding to the captured image data, predetermined features relating to the image;

initial probability adjusting module for adjusting the initial probability values for the one or more semantic labels based on the analysis of the captured contextual information and on the identified features; and an image data analyzing module for analysing at least a portion of the image comprising the object using the statistical or probabilistic interpretation model, in order to select at least one of the distinct semantic labels to describe the object, wherein said at least one semantic label is selected by multiplying the adjusted initial probability value for each semantic label with a conditional probability density value determined for the portion of the image.

17. The computer readable medium recited in claim 16, further including a labelling module for providing metadata describing the identified objects of the image.

18. An apparatus for selecting a semantic label to describe a portion of an image using a statistical or probabilistic interpretation model, said apparatus comprising:

means for providing one or more distinct semantic labels;

means for determining an initial probability value for substantially each of the one or more semantic labels, each of said initial probability values being set to a predetermined default value for each of the one or more semantic labels;

capturing means for capturing contextual information simultaneously with image data representing the image, the contextual information being directly associated with the captured image data and originating from one or more different types of information sources, the information sources being distinct from the image and the captured image data representing the image;

means for analyzing the contextual information captured with the image data to identify predetermined features relating to the image;

means for adjusting the initial probability values for the one or more semantic labels based on the analysis of the captured contextual information and on the identified features; and means for analysing at least the portion of the image using the interpretation model in order to select at least one of the distinct semantic labels to describe the portion of the image, wherein the at least one semantic label is selected by multiplying the adjusted initial probability value for each semantic label with a conditional probability density value determined for the portion of the image.

19. The apparatus as recited in claim 18, further including: means for interpreting the image in accordance with said at least one semantic label.

20. The apparatus as recited in claim 18, further comprising the step of providing metadata including said selected labels describing at least a portion of the content of the image.

21. The apparatus as recited in claim 20, wherein the metadata is an encoded representation providing information about at least a portion of the content of the image.

22. The apparatus as recited in claim 20, wherein the metadata includes information regarding adjacency of regions of the image.

23. The apparatus as recited in claim 18, further comprising:

means for segmenting the image into substantially homogeneous regions;

means for analyzing the regions to provide a Region Adjacency Graph (RAG); and means for associating at least one of the one or more semantic labels with the Region Adjacency Graph to provide a labeled Region Adjacency Graph.

24. The apparatus as recited in any one of claims 20 to 22, wherein the metadata is associated with the image.

25. The apparatus as recited in claim 24, wherein the statistical or probabilistic interpretation model is a Markov Random Field Model.

26. The apparatus as recited in claim 18 or 22, wherein the contextual information originated from any one or more of the following types of information sources:
   audio information;
   electromagnetic spectral information;
   environmental information;
   time lapse or sequential image information; and
   textual annotation, phrases or keywords associated with the image.

27. The apparatus as recited in claim 26, wherein the statistical or probabilistic interpretation model is a Markov Random Field Model.

28. The apparatus as recited in claim 18, wherein the means for adjusting includes a means for selecting a predetermined application domain from a plurality of application domains based on the features identified.

29. An apparatus for selecting a semantic label to describe an object in an image, using a statistical or probabilistic interpretation model the apparatus comprising:
   means for providing one or more distinct semantic labels;
   means for determining an initial probability value for substantially each of the one or more semantic labels, each of said initial probability values being set to a predetermined default value for each of the one or more semantic labels;
   means for capturing contextual information simultaneously with image data representing the image, the contextual information being directly associated with the captured image data and originating from one or more different types of information sources, the information sources being distinct from the image and the captured image data representing the image;
   means for analyzing the contextual information captured with the image data to identify predetermined features relating to the image;
   means for adjusting the initial probability values for the one or more semantic labels based on the analysis of the captured contextual information and on the identified features;
   means for analyzing at least a portion of the image data comprising the object using the statistical or probabilistic interpretation model; and
   means for selecting at least one of the distinct semantic labels to describe the object in the image based on the image data analysis, wherein the at least one semantic label is selected by multiplying the adjusted initial probability value for each semantic label with a conditional probability density value determined for the portion of the image.

30. The apparatus as recited in any one of claims 18, 19, 20–23, 28, or 29, wherein the statistical or probabilistic interpretation model is a Markov Random Field Model.

31. A method of selecting a semantic label to describe a portion of an image, using a statistical or probabilistic interpretation model, said method comprising the steps of:
   providing one or more distinct semantic labels;
   determining an initial probability values for substantially each of the one or more semantic labels, each of said initial probability values being set to a predetermined default value for each of the one or more semantic labels;
   capturing contextual information simultaneously with image data representing the image, the contextual information being directly associated with the captured image data and originating from one or more different types information sources, said information sources being distinct from the image and the captured image data representing the image;
   analyzing the contextual information captured with the image data to identify predetermined features relating to the image;
   selecting an application domain from a plurality of predetermined application domains based on the features identified, each of the predetermined application domains having a corresponding one or more of the semantic labels;
   adjusting the initial probability values for the one or more semantic labels of the selected application domain based on the analysis of the contextual information and on the identified features; and
   analysing at least the portion of the image using the interpretation model in order to select at least one of the distinct semantic labels to describe the portion of the image, wherein the at least one semantic label is selected by multiplying the adjusted initial probability value for each semantic label with a conditional probability density value determined for the portion of the image.

32. A method of selecting a semantic label to describe at least one portion of an image, using a statistical or probalistic interpretation model, said method comprising the steps of:
   providing one or more distinct semantic labels;
   determining an initial probability value for substantially each of the one or more semantic labels, each of said initial probability values being set to a predetermined default value for each of the one or more semantic labels;
   capturing audio data simultaneously with image data representing the image;
   analyzing the audio data captured with the image data to identify predetermined features relating to the image;
   adjusting the initial probability values for the one or more semantic labels based on the analysis of the audio data and on the identified features; and
   analysing at least the portion of the image using the interpretation model in order to select at least one of the distinct semantic labels to describe the portion of the image, wherein the at least one semantic label is selected by multiplying the adjusted initial probability value for each semantic label with a conditional probability density value determined for the portion of the image.

* * * * *

UNITED STATES PATENT AND TRADEMARK OFFICE
CERTIFICATE OF CORRECTION

PATENT NO. : 6,922,489 B2
DATED : July 26, 2005
INVENTOR(S) : Alison Joan Lennon et al.

It is certified that error appears in the above-identified patent and that said Letters Patent is hereby corrected as shown below:

Column 3,
Line 9, "representation" should read -- representation of --.

Column 5,
Line 13, "a" should read -- an --.
Line 19, "example;" should read -- example, --.
Line 40, "audio," should read -- audio --.
Line 43, "example," should read -- example --.

Column 6,
Line 14, "of:" should read -- of --.

Column 7,
Line 2, "$x_i$," should read -- $x_i$ --.
Line 40, "example;" should read -- example, --.
Line 66, "based For" should read -- based. For --.

Column 9,
Line 55, "analysing" should read -- analyzing --.

Column 10,
Line 16, "of" should read -- of: --.

Column 11,
Line 7, "claims 1, 2, 3-8," should read -- claims 1-5, 8, --.
Line 14, "values" should read -- value --.
Line 20, "information" should read -- information, --.
Line 33, "analysing" should read -- analyzing --.

Column 12,
Lines 3 and 37, "analysing" should read -- analyzing --.

Column 13,
Line 25, "model" should read -- model, --.
Line 57, "claims 18, 19," should read -- claims 18-23, --.
Line 58, "20-23," should be deleted.

UNITED STATES PATENT AND TRADEMARK OFFICE
CERTIFICATE OF CORRECTION

PATENT NO. : 6,922,489 B2
DATED : July 26, 2005
INVENTOR(S) : Alison Joan Lennon et al.

It is certified that error appears in the above-identified patent and that said Letters Patent is hereby corrected as shown below:

<u>Column 14,</u>
Line 2, "values" should read -- value --.
Lines 27 and 53, "analysing" should read -- analyzing --.

Signed and Sealed this

Sixth Day of June, 2006

JON W. DUDAS
*Director of the United States Patent and Trademark Office*